Figure 1:
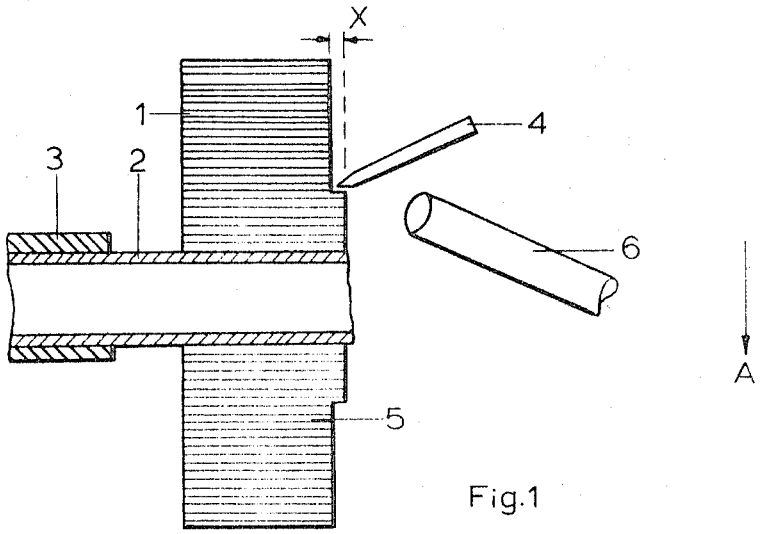
Figure 2:
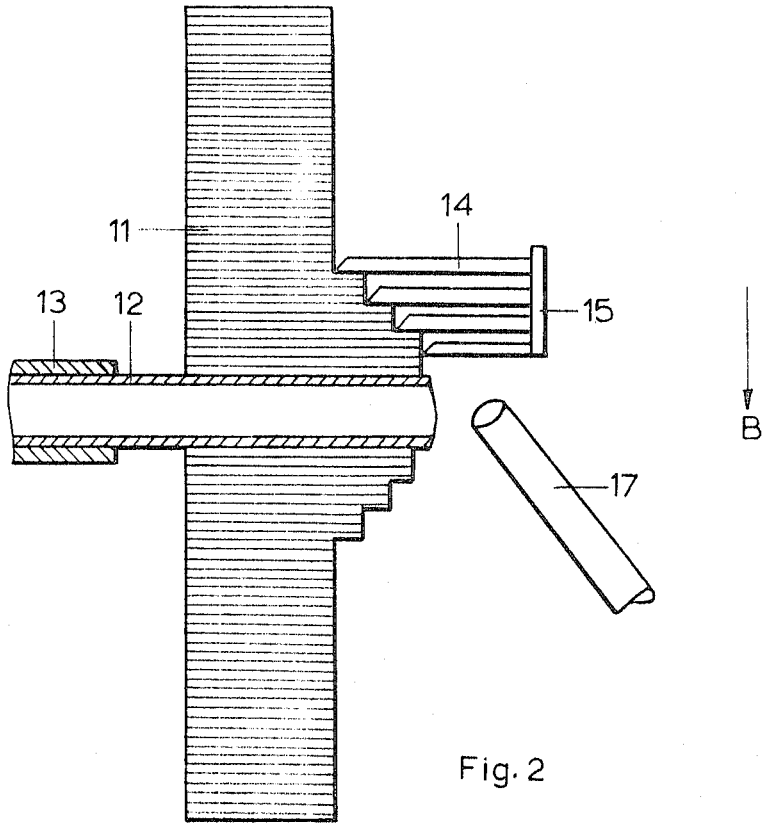
Figure 3:
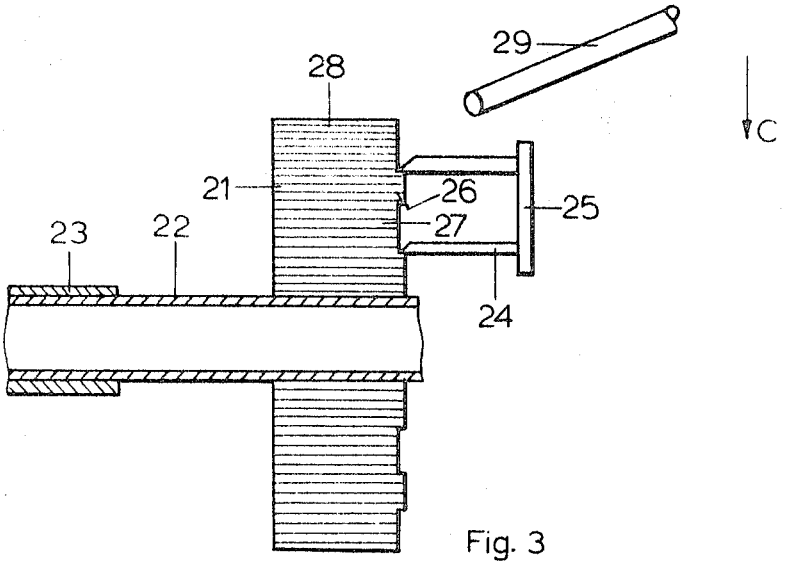
Figure 4:
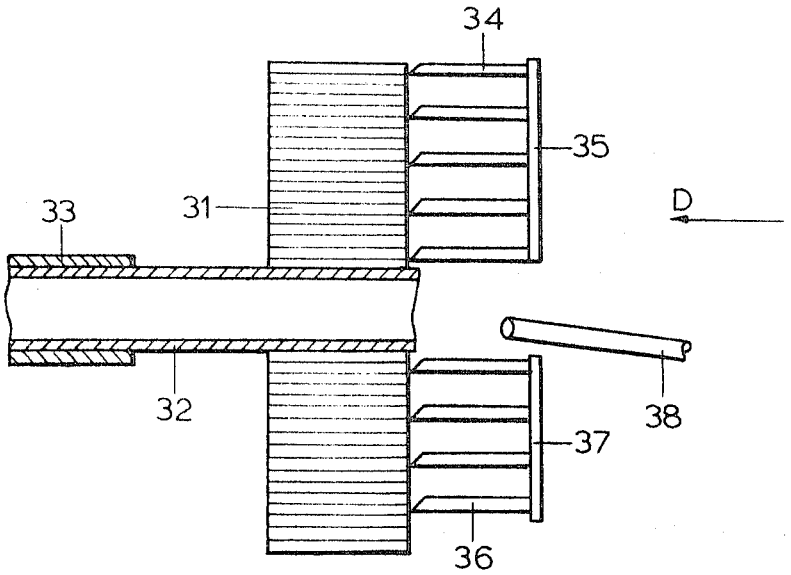

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 706

T888,009

PRODUCTION OF THERMOPLASTICS ARTICLES

Robert Lawrence Scott-Cook, % Imperial Chemical Industries, Ltd., Plastic Division, Bessemer Road, Welwyn Garden City, Hertfordshire, England

Filed Nov. 13, 1970, Ser. No. 89,351
**Int. Cl. B32b *17/00***
U.S. Cl. 156—62.4
2 Sheets Drawing. 21 Pages Specification

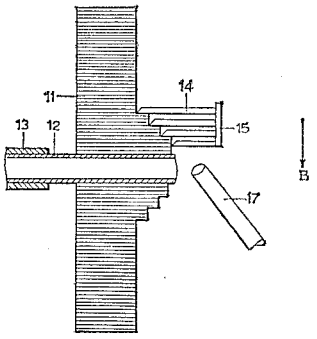

Fibers for the manufacture of non-woven materials are produced by superimposing a plurality of layers of thermoplastic film on a reel, rotating the reel thus formed on a lathe and feeding a cutting tool across the superimposed layers of film towards the axis of the lathe as it rotates. If the cutting tool is advanced across the edge of the reel by a distance per revolution of the reel which is greater than the thickness of the film, the individual fibers thus produced have broken fibrils spaced widely apart along their length. If the distance per revolution is less than the thickness of the film a network of interconnected fibers is produced. As the thermoplastic material, uniaxially or biaxially oriented polypropylene or polyethylene terephthalate is used, coated on at least one side, preferably both, with a heat sensitive coating such as a vinyl chloride polymer or copolymer.

The denier of the fibers varies with the thickness of the film used including coating and the amount of film shaved by the cutting tool or tools. The fibers are collected by suitable means adjacent to the cutting tool and formed into a non-woven material, first by arranging them in a random distribution pattern by any convenient process, such as air laying on a perforated drum, and optionally blending with other fibers, then bonding together with heat and pressure sufficient to fuse the heat sensitive material, using conventional techniques. Non-woven fabrics thus produced are used in the manufacture of garments as stiffening in wearing apparel and as interlinings. They are optionally laminated to other fabrics.

July 20, 1971 R. L. SCOTT-COOK T888,009

PRODUCTION OF THERMOPLASTICS ARTICLES

Filed Nov. 13, 1970 2 Sheets-Sheet 1

Inventor
ROBERT LAWRENCE SCOTT-COOK

By
Cushman, Darby & Cushman
Attorneys

PRODUCTION OF THERMOPLASTICS ARTICLES

Filed Nov. 13, 1970 2 Sheets-Sheet 2

Inventor
ROBERT LAWRENCE SCOTT-COOK
By
Cushman, Darby & Cushman
Attorney